UNITED STATES PATENT OFFICE.

JOSEPH JOHN CARTER, OF ALVIN, ASSIGNOR TO A. C. HILL AND W. W. MAXWELL, OF TRAVIS COUNTY, TEXAS.

INSECTICIDE.

SPECIFICATION forming part of Letters Patent No. 482,403, dated September 13, 1892.

Application filed June 13, 1892. Serial No. 436,558. (No specimens.)

*To all whom it may concern:*

Be it known that I, JOSEPH JOHN CARTER, a citizen of the United States, residing at Alvin, in the county of Brazoria and State of Texas, have invented certain new and useful Improvements in Insecticide Compounds; and I do declare the following to be a full, clear, and exact description of the invention, such as will enable others skilled in the art to which it appertains to make and use the same.

My invention has relation to improvements in insecticides; and it is designed more especially for the destruction of weevils, a small insect of the beetle family, which injures corn by boring through the shucks or outer covering and feeding upon the ear.

The general object of my invention is to provide a compound capable, when affected by moisture incidental to the sweating of the corn in the crib, of generating a poisonous gas which will permeate the shucks and reach and destroy the insect within the shucks, where it cannot be destroyed by simply sprinkling the corn with a poisonous powder or solution.

To the attainment of the foregoing and other objects, the invention consists of a composition of matter embodying the following ingredients, combined in about the proportions stated, viz: sodium chloride, three parts; slaked lime, three parts; flour of sulphur, one part; bicarbonate of soda, one part. These ingredients are thoroughly sifted and mixed and the compound is then ready for use.

In order to effectually destroy the insects, the corn should be gathered and cribbed before it is too dry, so that while in the crib it will undergo a sweating process.

In using my improved gas-generating compound it is sprinkled evenly over the corn while the same is being cribbed, so that when the corn sweats the moisture given forth therefrom will generate and set free a gas from the compound, which gas permeates the corn, as before stated, and destroys all the insects.

In the practice of my invention I design using about fifteen pounds of the compound to each one hundred bushels of corn, as I have learned from experience that this proportion is productive of the best results.

Having described my invention, what I claim, and desire to secure by Letters Patent, is—

The herein-described compound for the purpose described, consisting of sodium chloride, slaked lime, flour of sulphur, and bicarbonate of soda, substantially as specified.

In testimony whereof I affix my signature in presence of two witnesses.

JOSEPH JOHN CARTER.

Witnesses:
J. H. DAWSON,
ROBERT HENIG.